United States Patent [19]

La Barre et al.

[11] Patent Number: 5,304,027
[45] Date of Patent: Apr. 19, 1994

[54] BUFFER STORAGE MACHINE FOR CONTAINER CONVEYOR LINE

[75] Inventors: Paul La Barre, Sainte-Adresse; Jacques Le Guyader, Le Havre, both of France

[73] Assignee: Sidel, Le Havre Cedex, France

[21] Appl. No.: 35,692

[22] Filed: Mar. 23, 1993

[30] Foreign Application Priority Data

Mar. 24, 1992 [FR] France .................. 92 03518

[51] Int. Cl.⁵ .................................................. B65G 1/10
[52] U.S. Cl. .................... 414/331; 198/347.2; 198/347.3; 406/86
[58] Field of Search .................... 414/331, 676, 280; 198/347.2, 347.3; 406/86, 88, 154, 155, 194

[56] References Cited

U.S. PATENT DOCUMENTS

| | | | |
|---|---|---|---|
| 3,499,555 | 3/1970 | Wahle | 198/347.3 |
| 4,944,635 | 7/1990 | Carlier et al. | 406/10 |
| 5,028,174 | 7/1991 | Karass | 406/88 |

FOREIGN PATENT DOCUMENTS

| | | |
|---|---|---|
| 0485344 | of 1982 | European Pat. Off. . |
| 0427683 | of 1991 | European Pat. Off. . |
| 0486360 | of 1992 | European Pat. Off. . |
| 2170169 | of 1986 | United Kingdom . |

*Primary Examiner*—Frank E. Werner
*Attorney, Agent, or Firm*—Sughrue, Mion, Zinn, Macpeak and Seas

[57] ABSTRACT

A buffer storage machine for a bottle conveyor line includes a drum 15 rotatably indexed in a frame 14 by a motor 17. A number of radial struts 20 extend outwardly from the drum casing 19, and together with longitudinal members 21, 22, angle brackets 23 and straightedges 25, define sector shaped slots 30 for storing a row of bottles. A pneumatic transport box 32 extends the length of the machine above the uppermost row, and is raiseable to enable drum rotation. The machine is interposed between a bottle manufacturing unit 2 and a bottle filling unit 4 with half of the rows filled and the other half empty, such that if either unit is temporarily stopped, the other unit can continue operating.

6 Claims, 6 Drawing Sheets

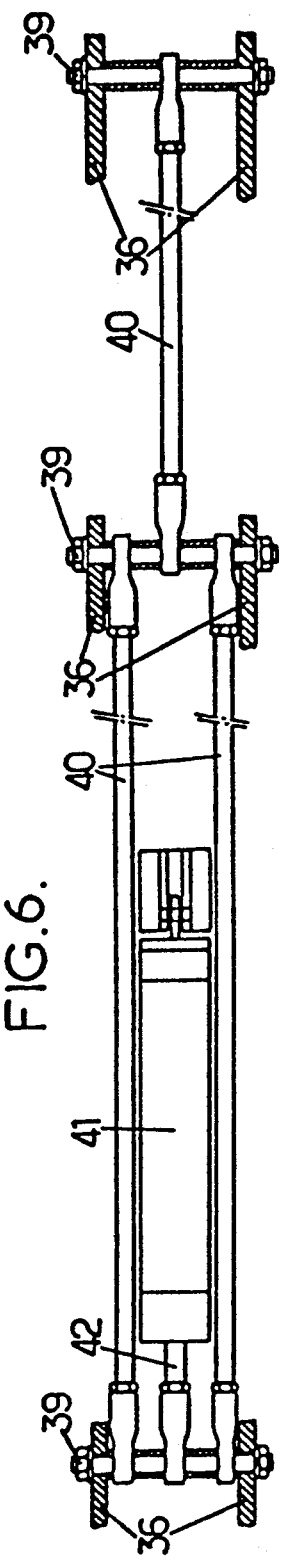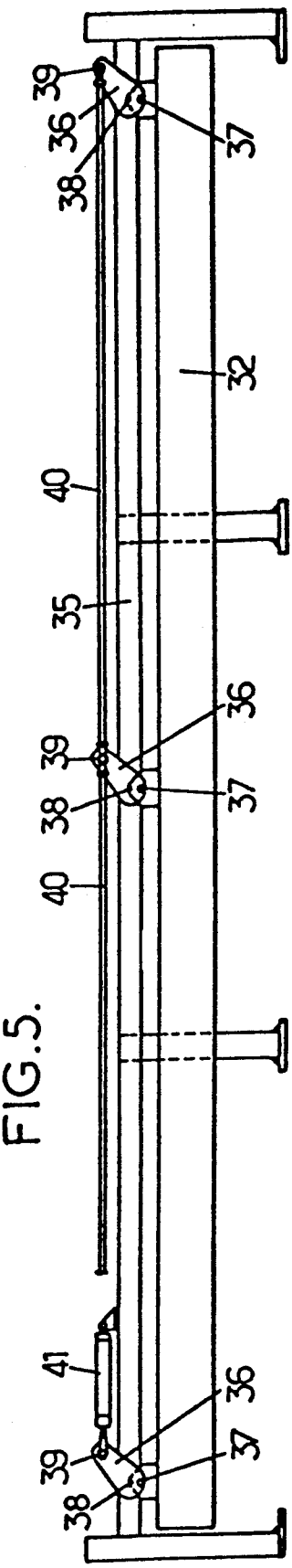

BUFFER STORAGE MACHINE FOR CONTAINER CONVEYOR LINE

BACKGROUND OF THE INVENTION

This invention generally concerns improvements made to equipment installations configured for transporting containers, in particular bottles or similar objects, between a beginning-of-line machine which feeds the containers and an end-of-line machine which uses them. The installation may, for example, be a bottle filling unit, in which the beginning-of-line machine is a machine which manufactures containers, such as plastic bottles, and the end-of-line machine fills the bottles. The invention is also applicable to other unit configurations, such as a filling machine and a packing machine, a machine for cleaning recycled bottles and a filling machine, etc.

When the end-of-line machine is fed directly with containers arriving from the beginning-of-line machine, the stoppage of one of the machines necessarily entails the stoppage of the other machine, and, in general, of the entire equipment line. A stoppage of this type is particularly disadvantageous because of the losses of production, of energy, of raw materials, and, more generally, of money thus engendered, even though the machines other than the one stopped remain in operating condition. These disadvantages are even more pronounced in the case of some machines, such as machines which manufacture bottles from plastic material, for which the stoppage-and-restart process entails a loss of usable bottles discarded as waste, and the restart process is lengthy. Complete stoppage of this kind of machine must, therefore, be avoided at all costs.

To remedy this problem, conventional practice provides a buffer unit in a conveyor line, e.g., between a plastic bottle manufacturing machine and a filling machine, to regulate the flow of containers being transported between the beginning-of-line machine and the end-of-line machine, so that a brief stoppage of either of the two machines does not require the stoppage of the other machine, whether beginning-of-line or end-of-line.

The buffer function is widely implemented by making the conveyor chain between the beginning-of-line and end-of-line machines very long (this length can reach one hundred meters in some installations). This configuration proves very disadvantageous, since it requires a large space for the layout of the conveyor chain. To save space on the floor, this chain may, conventionally, be driven upwardly above the rest of the installation; however, the resulting complexity of the conveyor chain may entail increased cost. Furthermore, the use of a very long conveyor chain in a space of limited dimensions makes it necessary to give the chain a shape in which it is folded over on itself, with numerous curves and bends. A number of conveyor systems function properly in a straight line, but give inferior performance when the pathway is curved. The improvement of the curved operating configuration leads to greater complexity, and thereby, here again, to more costly equipment. Moreover, whatever the operating principle, the cost per linear meter of a conveyor chain is high, and any increased length is economically undesirable. In addition, transport over great lengths has the disadvantage of increasing the risk of scoring or damaging the containers.

The buffer function can also be implemented by providing shunt sections connected to the principal conveyors by means of switches. Here again, this kind of configuration requires a large available space, and its upwardly extending construction exhibits the same disadvantages as in the preceding case. Furthermore, the switches are very expensive devices which exist in great number within the unit.

Finally, conventional practice encompasses still other buffer devices formed by hoppers in which the containers are stored in bulk. These devices have the disadvantage of damaging the containers during storage and when they are extracted from the hoppers.

SUMMARY OF THE INVENTION

A basic purpose of the invention is to remedy the aforementioned problems in conventional units and to provide an improved machine which better meets the various requirements demanded by current practice, in particular because it requires much less space, is structurally relatively simple, and is, overall, less costly than previous equipment installations.

To these ends, the invention provides a machine for storing containers, in particular, bottles or similar objects, which is designed to be incorporated between a beginning-of-line machine and an end-of-line machine, in order to regulate the transport feed rate of the containers circulating from the beginning-of-line machine to the end-of-line machine in the event that either of these machines is slowed or briefly stopped. The container-storage machine, configured according to the invention, basically comprises:

an elongated frame;

an elongated drum capable of being driven in rotation about a longitudinal axis, and supported as it rotates by the frame;

a plurality of transport slots provided on the drum and uniformly spaced around its periphery, the slots being configured to receive containers extending substantially radially while being arranged in succession one after the other;

means for indexing the drum around its axis to bring a selected slot to a position facing stationary container feed and container removal means aligned with each other, parallel to the drum axis, and supported by the opposite ends of the frame; and container transport means for moving the containers into a selected slot brought into a position coincident with the container feed and removal means.

In a simple embodiment, each slot comprises two parallel, longitudinal sections borne by the drum body and constructed to support the necks of the containers while allowing them to slide freely.

The container transport means are preferably pneumatic means capable of acting on the necks of the containers. These pneumatic means are supported on the frame and are radially movable in order to occupy two functional positions, i.e., a lowered position in which they are brought radially closer to the drum, function in conjunction with the necks of the containers located in a slot selectively brought into position between the feed and removal means, and move the containers forward in the slots; and a raised position in which they move radially away from the drum, in order to release the necks of the containers in the slots extending between the feed and removal means and to permit the rotation of the drum. The feed and removal means themselves comprise pneumatic transport means solidly attached to the ends of the machine frame and provide, in conjunction with the movable pneumatic means arranged in the lowered position, for the continuous circulation of the containers.

To achieve proper position retention and guidance of the containers in the slots, each slot further comprises longitudinal, parallel guides borne by the drum body, while being radially spaced apart from the sections in the direction of the longitudinal axis of the drum and being capable of forming a guidance support for the bodies of the containers inserted in the slot.

To extend the range of use of the machine, the sections and longitudinal guides are made radially and transversely adjustable in order to adapt the slot to containers of different dimensions.

In an embodiment which proves remarkably effective while utilizing technically simple means, the stationary container removal means also incorporate a selectively movable barrier configured to close off the selected slot positioned in conjunction with the removal means during a slot filling phase, and to open the selected slot when the containers in them must be removed.

In a preferred embodiment, the feed, removal, and container transport means are positioned in the upper part of the frame. Accordingly, the transport means incorporated into the machine are located approximately at the same height as the transport means located toward both the beginning and end of the line in relation to the storage machine. The result is a simplified installation of all of the transport means connecting the beginning-of-line machine to the end-of-line machine.

To ensure reliable operation and to avoid jamming of the containers between the drum and the structures of the stationary frame (in particular, the container feed and container removal means), the machine further comprises means for detecting the filling of a selected slot, located on the side facing the feed mechanism. The detection means is functionally connected to the container transport means in order to control the operation and cutoff of the latter as a function of the filling of the selected slot.

Because of the arrangements made possible by the invention, a machine is provided which allows the storage of a large number of containers distributed among multiple slots, and which takes up a relatively modest amount of space, much less than the space required by the various structures that have been used to date for the same purpose. As an example, a machine equipped with a drum approximately six meters long and fitted with twelve storage slots can provide a maximum capacity of approximately 700 plastic bottles, each having a capacity of 1.5 liters.

A storage machine according to the invention can impart a high degree of operational flexibility to a production line, e.g., a bottle filling line, and makes it possible to avoid the complete stoppage of the line, with all of its attendant problems, in the event of a brief cutoff of one of the machines of the line.

To that end, the storage machine according to the invention advantageously comprises operating management means capable of selectively controlling:

the filling of approximately one-half of the number of slots and keeping approximately the other one-half of the slots empty, when the beginning-of-line and end-of-line machines are operating normally;

the rotational, position-by-position actuation of the drum and successive emptying of the container filled slots, when the beginning-of-line machine is momentarily stopped, so that the end-of-line machine continues to be supplied with containers;

the rotational, position-by-position actuation of the drum and the successive filling of the empty slots, when the end-of-line machine is momentarily stopped, so that the beginning-of-line machine can continue to function. By considering once again the typical example cited above, the aforementioned storage capacity makes it possible, for example, when the beginning-of-line machine is stopped, to ensure the supply of containers coming from the approximately half-filled drum to the end-of-line machine for a period of about two minutes (since the end-of-line machine continues to function at normal speed). This makes available the period of time required to effect the rapid repair of the beginning-of-line machine (unjamming of a container, replacement of an easily-accessible component, etc.).

It is also possible to provide that the control means be so configured that, in the event of cutoff of the beginning-of-line machine, the end-of-line machine will function at reduced speed and that, in the event of stoppage of the end-of-line machine, the beginning-of-line machine will be stopped and put in the stand-by mode allowing fast restart.

Advantageously, the storage machine can be incorporated into a direct line for the transport of containers circulating between the beginning-of-line machine and the end-of-line machine, and the control means can be configured to keep an empty slot positioned between the feed and removal means, when the beginning-of-line and end-of-line machines are functioning normally. The slot thus kept empty between the feed and the removal means ensures the continuity of the transport means between the beginning-of-line machine and the end-of-line machine, and the storage machine then remains functionally neutral during the period of normal operation of the beginning-of-line and end-of-line machines.

BRIEF DESCRIPTION OF THE DRAWINGS

FIG. 5 is a side view of construction detail of the machine in FIG. 2;

FIG. 6 is an enlarged top view of the construction detail in FIG. 5; and

DETAILED DESCRIPTION OF THE PREFERRED EMBODIMENT

Figure 1:
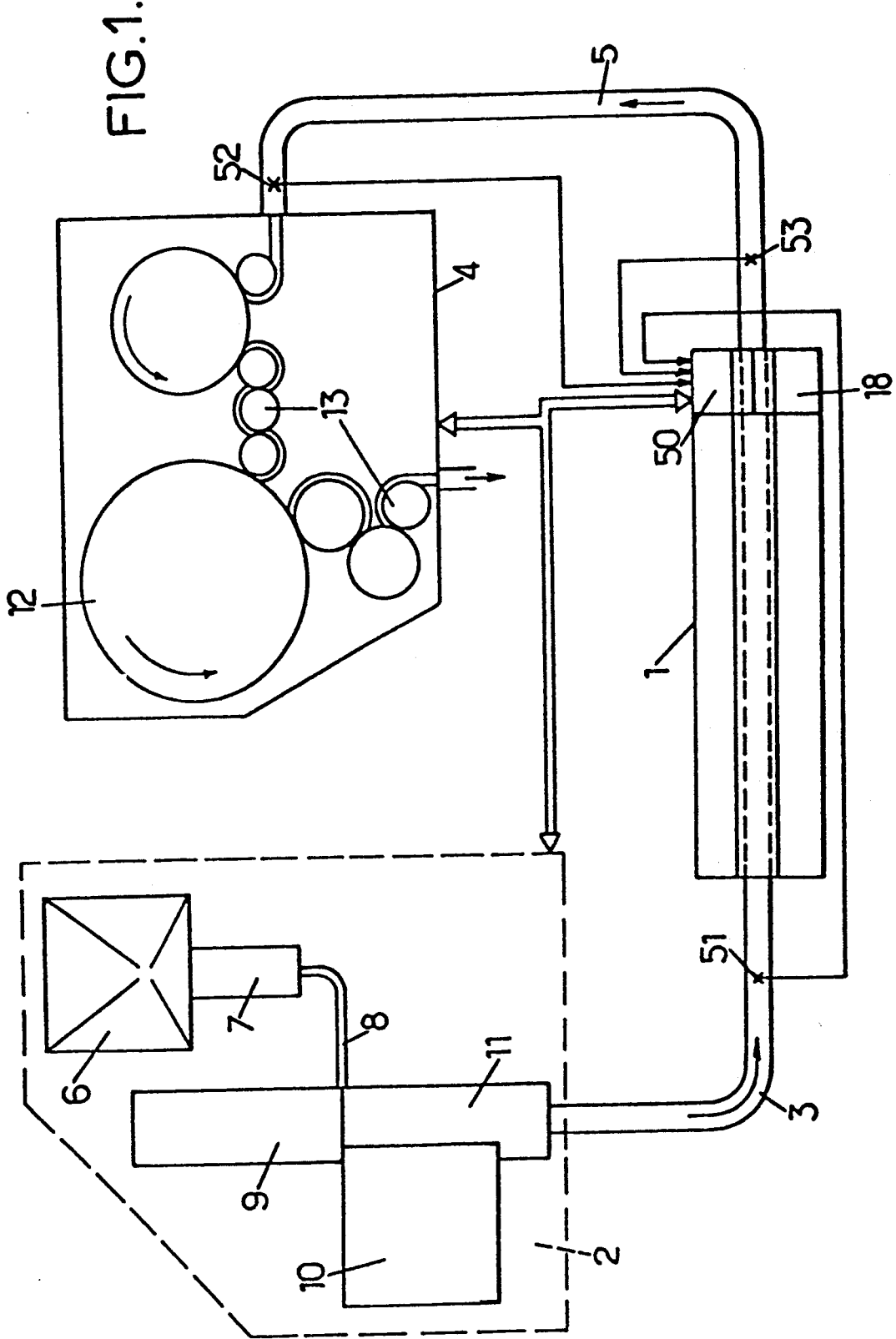
FIG. 1 is a very diagrammatic plane view of an equipment installation incorporating a container-storage machine according to the invention.

FIG. 1 shows an equipment installation of the kind covered by the invention, in which a machine 1 for the storage of containers is interposed between a beginning-of-line machine 2, to which it is connected by an infeed conveyor 3, and an end-of-line machine 4, to which it is connected by an outfeed conveyor 5. The containers supplied from the beginning-of-line machine 2 are transported by the conveyor 3, the machine 1, and the conveyor 5, to the end-of-line machine 4.

In the example illustrated in FIG. 1, the beginning-of-line machine 1 manufactures plastic containers by blowing or stretch blowing and comprises, in particular, a preform feed hopper 6, at the base of which the preforms are collected by a position-elevator unit 7 which orients the preforms vertically, their openings pointed upwardly. The preforms are then transported through a chute 8 to an infrared oven 9, from which they travel to a stretching machine-blower 10. The containers thus formed are then cooled in a cooling chamber 11 before being transported away.

The end-of-line machine 4 is a filling machine equipped with a circular filling conveyor 12 linked to rotary fork conveyors 13 and supplies filled containers, which are then transported to packing units (not shown).

Although the system shown is a typical example of an installation involving the use of a storage machine according to the invention, this example is not restrictive, and the machine according to the invention may be utilized in other units.

Figure 2:
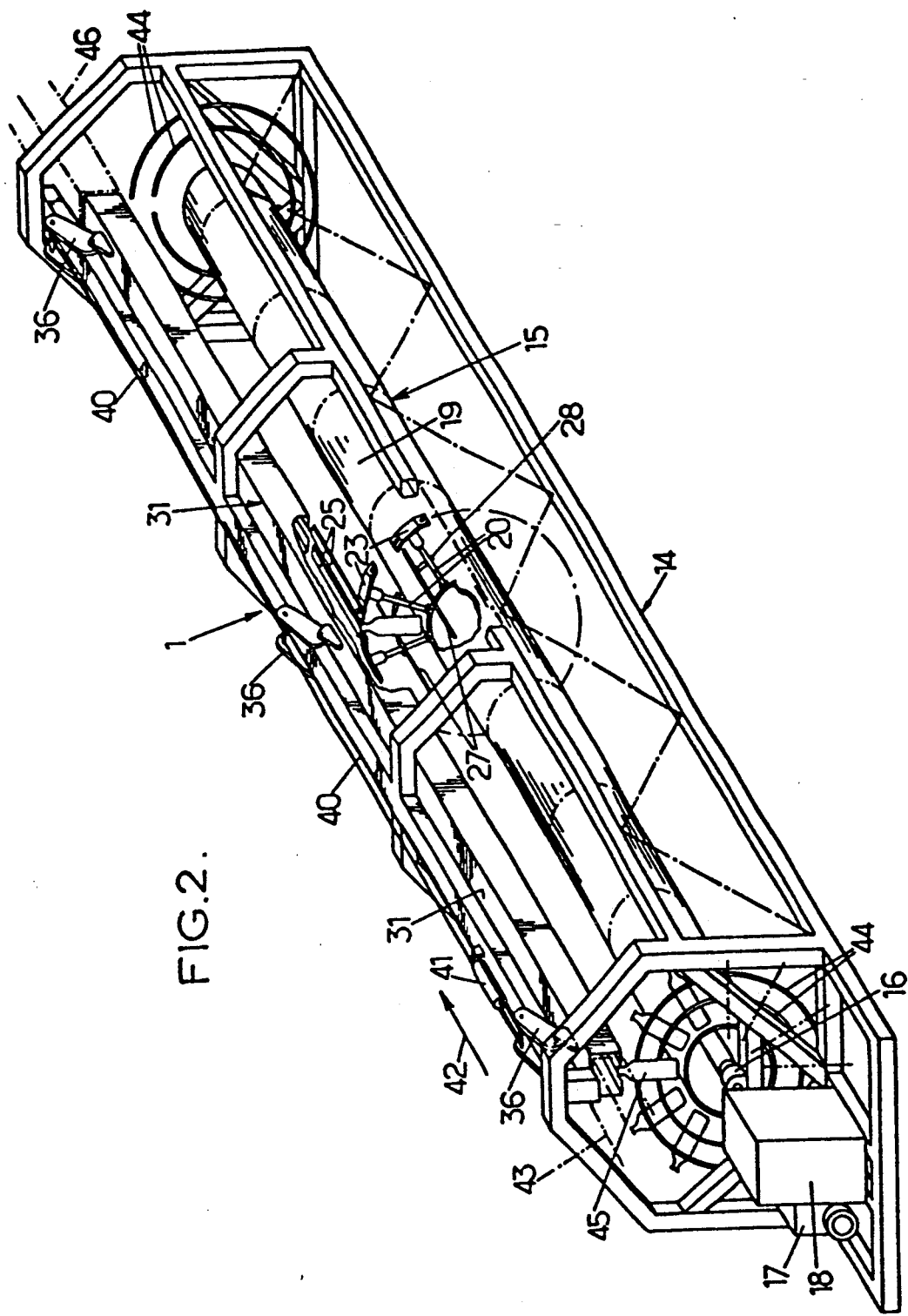
FIG. 2 is a diagrammatic perspective view of the entirety of the storage machine according to the invention.

The storage machine 1 is illustrated in its entirety in FIG. 2. It comprises a stationary frame 14 formed from a set of metal bars assembled in a latticework arrangement, whose construction allows it to support a rotating drum 15 on bearings 16. One end of the frame incorporates motorized means 17 capable of driving the drum in rotation and a box 18 housing various functional and control means required for the operation of the machine, to be described below.

Figure 3:
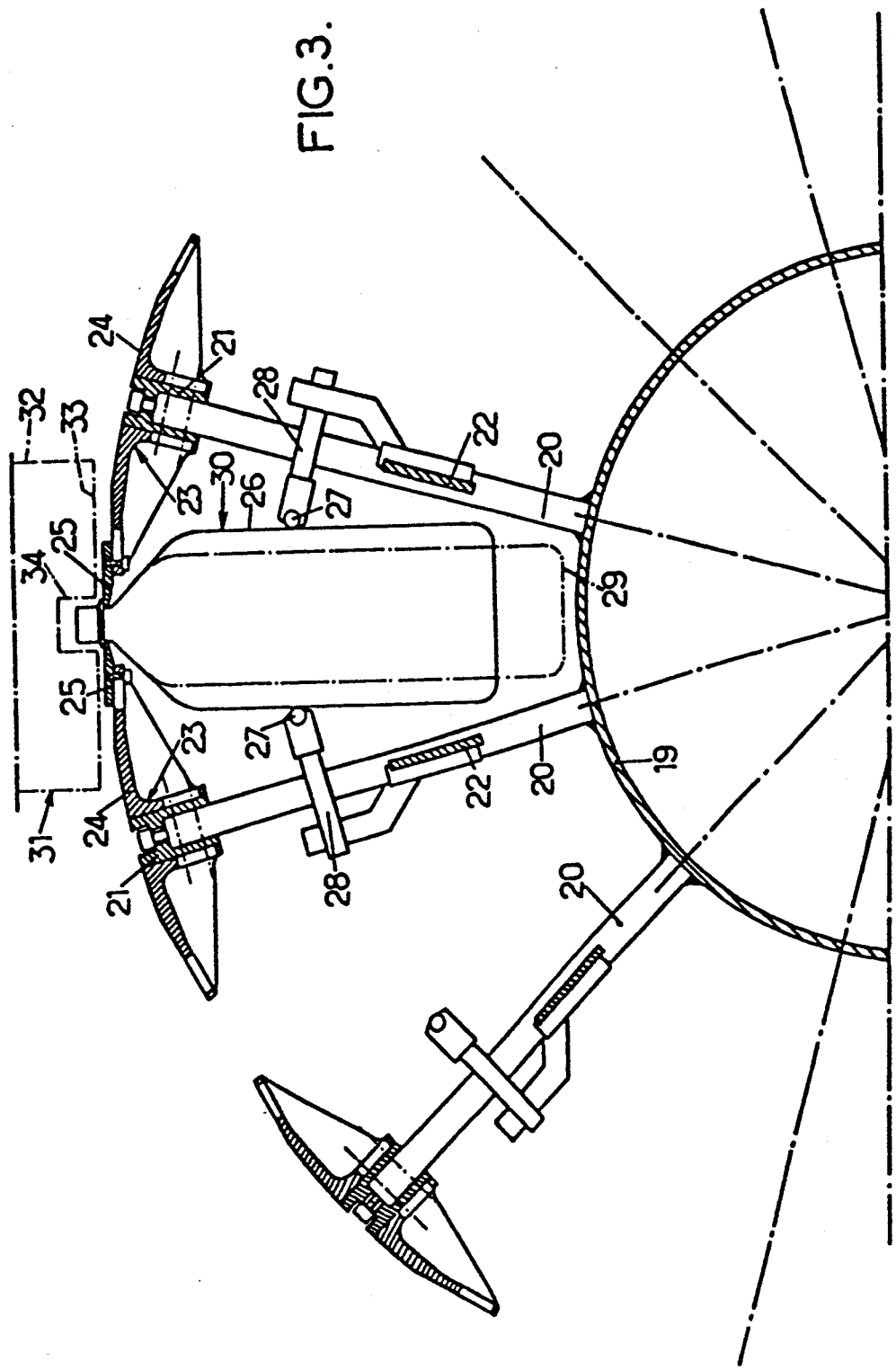
FIG. 3 is a partial view in transverse cross-section of the drum belonging to the storage machine in FIG. 2, showing construction detail of the drum.

With reference to FIGS. 2 and 3, the drum 15 comprises a tubular casing 19 coaxial to and mounted on a shaft turning in the bearings 16, and supporting an annular superstructure in which are formed a series of longitudinal slots (twelve in the example shown) used to house bottles.

The superstructure is formed by radial struts 20 firmly fastened to the tubular casing, the struts being arranged in several rings extending around the casing 19 and the rings being evenly spaced over the length of the casing. Longitudinal members 21 located at the free ends of the struts, and longitudinal members 22 positioned approximately in the middle of the struts, extend parallel to the axis of the casing 19 and attach the struts at the same angled position over the entire length of the drum. In this way, a rigid, radiating structure is formed which delineates, around the tubular casing 19, an annular area which, seen in transverse cross-section, is subdivided into angled sectors (of about 30° in the example considered) free of all obstacles and forming unobstructed slots 30 for the passage of containers.

At the free ends of the struts 20, angle brackets 23 are mounted transverse to the drum axis. The angle brackets on two struts in angled succession incorporate arms 24 extending toward each other. Each longitudinal assembly of arms extending toward each other has mounted on it, respectively, two rigid straightedge sections 25 parallel to each other and spaced apart by a distance slightly greater than the diameter of the necks of the containers, so that the containers 26 can be inserted by their necks between the straightedge sections 25 and can rest on them by means of their neck flanges, while extending radially, as shown in FIG. 3.

To ensure proper radial position-retention and guidance of the containers 26, two longitudinal guides 27 (e.g., metal rods) are positioned approximately in the middle of the struts 20 and supported on them or on the longitudinal members 22 by brackets 28, so that the spacing between them approximately matches the diameter of the bodies of the containers 26.

To ensure a high degree of operating flexibility of the machine, the length of the strut 20 is made to correspond to at least the height of the longest container (shown at 29) which could be processed in the installation. Furthermore, the straightedge sections 25 are mounted to be transversely adjustable on the arms 24 of the angle brackets 23; the latter are mounted so as to be radially adjustable on the struts 20. Similarly, the brackets 28 are transversely and radially adjustable. It is thus possible to adapt the machine to containers having necks and/or bodies of different diameters or shapes. This adjustment can be performed easily and rapidly, for example, by using an adjustment system utilizing binding screws engaged in elongated slots.

All of the angled sectors delineated by the struts 20 are structurally configured in the same way, and all of the storage slots are thus identical.

To ensure the movement of containers into each slot 30, transport means 31 positioned above the drum are provided. These transport means are pneumatic or use air jets, as do the beginning-of-line and end-of-line conveyors 3 and 5, so as to preserve the homogeneity of the mechanisms used in the equipment.

The overall construction and operating method of the air-jet conveyors are known to the specialist. In the machine according to the invention, an elongated, tubular case or box 32 is located above the upper part of the drum and extends over its entire length. Blower means (not shown) are connected to the box in order to feed pressurized air to it. The lower face 33 of the box 32 exhibits an indentation substantially square or rectangular in section and forming a channel 34 allowing the engagement of the necks of the containers, the lateral walls of the channel 34 being slotted to direct the pressurized air onto the bottles and propel them.

The box 32 is fastened to the upper part of the frame 14 using fastening means (described below) allowing radial motion of the box in relation to the drum. In its lowered position as shown in FIG. 3, the lower face 33 of the box is brought into position closest to the drum 15, so that the channel 34 overhangs the slot delimited by the straightedge sections 25 of one slot, and so that the air losses between the drum and the channel are reduced to the minimum. This is the position required for moving the containers. In the raised position, the lower wall 33 of the box is positioned above the necks of the containers; the drum 15 can then turn freely.

Figure 7:
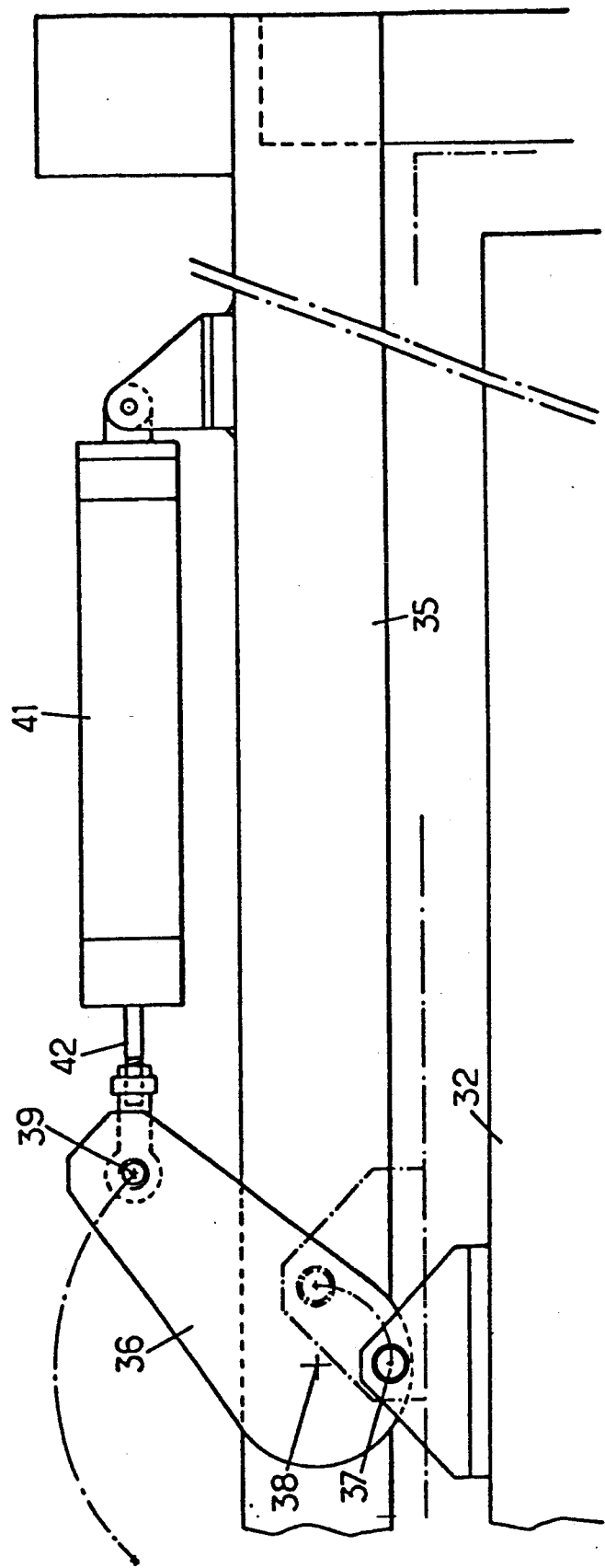
FIG. 7 is a very enlarged side view of one part of the construction detail in FIG. 5.

FIGS. 5 to 7 illustrate in detail the means used to support the box 32 and move it vertically. The box is suspended from an upper longitudinal beam 35 belonging to the frame 14 by several cranks 36 (three in this case) uniformly positioned over the length of the box. Each crank 36 is joined in rotation, at its lower end, by a shaft attaching it to the box 32 and, in its intermediate portion, by a shaft 38 attaching it to the beam 35. At its upper end, it is joined in rotation, by a shaft 39, to a system of connecting rods 40 extending over the entire length of the beam, between the end cranks. As shown in FIG. 6, pairs of cranks 36 may be placed on either side of the beam 35 and the box 32 and mounted on a single shaft 39. One pair of parallel connecting rods 40 connects two of the shafts 39, while a single connecting rod connects one of the shafts to the last shaft. A jack 41, either hydraulic or pneumatic, is fastened to the beam 35 between the two parallel connecting rods; the piston rod 42 of the jack is connected to a shaft 39 joining the two parallel connecting rods, thus forming a symmetrical arrangement capable of transmitting substantial force. Any motion of the jack piston rod 42, which is approximately horizontal, causes an angled motion of the shafts 37 over about 90°, and thus, a vertical movement of the case 32 (its raised position is illustrated by dotted lines in FIG. 7).

Furthermore, the unit is fitted with container feed and removal means, which are attached to the ends of the frame 14. The direction of travel of the containers is indicated by arrow 42 in FIG. 2. The feed mechanism incorporates a stationary air-jet conveyor box 43 (which could, for example, be the terminal section of the beginning-of-line pneumatic conveyor 3) for feeding the containers, the conveyor box being fastened to the frame 14 opposite and aligned with the box 32, in the lowered position. In addition, the same end of the frame supports stationary retention means 44 designed to retain the containers stored in the drum 15 and made, for example, of circular metal bars placed concentrically and coaxially to the drum. These bars do not extend over 360°, but leave an opening 45 in their upper part opposite the position occupied by the slot located beneath the box 32. The width of the opening can be adjusted to match the diameter of the containers, by providing adjustable sliding arms associated with the retention bars (not shown in FIG. 2).

Similarly, the removal mechanism, located at the other frontal end of the frame 14, also comprises a stationary air-jet conveyor box 46 (which may, for example, be the first section of the end-of-line pneumatic conveyor 5) designed to remove the containers, which is attached opposite, and aligned longitudinally with, the box 32 in its lowered position. Similarly, this end of the frame also supports retention bars 44, arranged as indicated above. Furthermore, the mechanism comprises a movable barrier (not shown) designed to seal off the passage left by the retention bars, this movable barrier being closed when the slots are filled in order to act as a stop for the containers fed into the slots, while it opens to allow the passage of the containers when the slots are being emptied.

Figure 4:
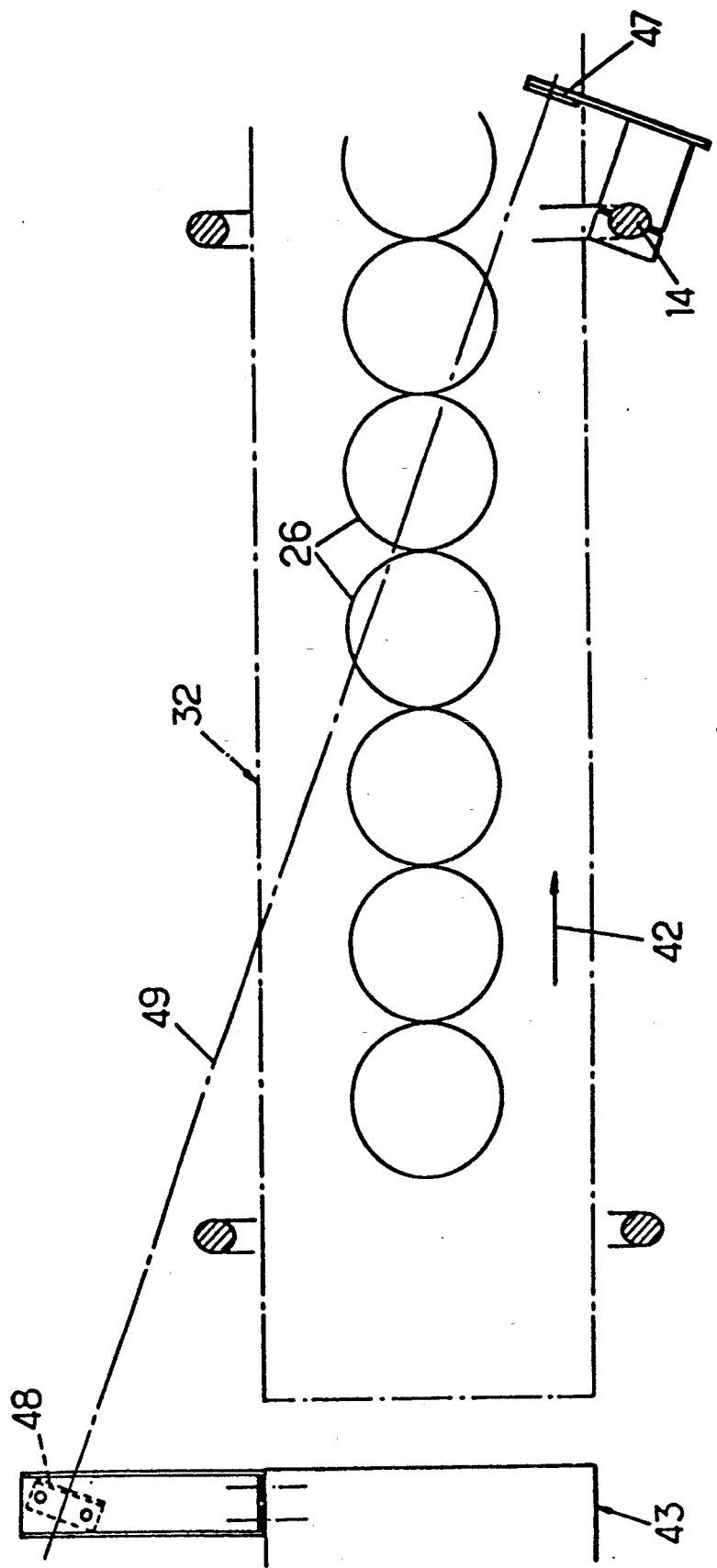
FIG. 4 is a view of construction detail of the machine in FIG. 2.

Finally, in conjunction with the position of the slot located beneath the conveyor box 32, means for detecting the filling of the slots (illustrated in FIG. 4) are provided. In proximity to the feed end, the frame 14 supports a transmitting-receiving photoelectric cell 47 and a reflector 48 positioned on opposite sides of the path followed by the bodies of the containers transported in the slots associated with the pneumatic conveyor mechanism. The cell and the reflector are so positioned that the beam 49 is oblique in relation to the axis of the slot and intersects it at approximately the sixth container position preceding the feed end of the drum. A delay-time triggers the cutoff of the container feed as soon as the cell 47 is blacked out in stable fashion, and assurance is thus provided that the number of containers fed into the slot does not exceed capacity. Of course, it is also possible to configure the mechanism for detection of the filling of the slot as a bottle counter which allows only a predetermined number of bottles to penetrate into the slot.

The machine just described is also equipped with control means 50 (placed in the box 18, for example) which make it possible to control its operation. One particularly advantageous example of operation is described below.

The machine 1 is incorporated into the line formed by conveyors 3 and 5 between the beginning-of-line and end-of-line machines 2 and 4. Otherwise stated, whatever the operating mode selected, all containers traveling from the beginning-of-line machine 2 to the end-of-line machine 4 pass through the machine according to the invention. Accordingly, the control means are configured to continuously keep one empty slot in the raised position between the feed and removal boxes, when the beginning-of-line and end-of-line machines 2 and 4 are both functioning normally. The machine 12 is then "transparent", and its slot, in the raised position, constitutes one of the components of the conveyor line connecting the beginning-of-line and end-of-line machines.

The control mechanism is, moreover, configured to control the filling of a certain number of slots when operation begins; for example, three-quarters of the slots full and one-quarter empty; two-thirds of the slots full, one-third empty; or finally, half full and the other half empty.

In the event of a breakdown of the beginning-of-line machine, with the end-of-line machine remaining operational, the interrupted container feed is detected by beginning-of-line sensors 51 (FIG. 1) linked to the beginning-of-line conveyor 3, and the control mechanism 50 then orders the position-by-position rotation of the drum 15, so that the slots filled with containers are emptied in succession, thus allowing the continuing feed of the end-of-line machine 4. When the beginning-of-line machine is restored to service, the reserve supply in the drum 15 is gradually replenished as feed to the end-of-line machine continues.

In the event of a breakdown of the end-of-line machine 4, the output from a first end-of-line sensor 52, located in proximity to the end-of-line machine 4, blocks the arrival of containers, which accumulate in the end-of-line conveyor 5. A second end-of-line sensor 53 detects the filling of the end-of-line conveyor 5, and the control mechanism then orders the position-by-position rotation of the drum 15, so that the empty slots are filled in succession. When the end-of-line machine is made operational again, the slots in the drum intended to be kept empty are progressively emptied.

A further advantage may be gained, moreover, when the control mechanism can order operation at a reduced speed of the end-of-line machine, which remains in service when the beginning-of-line machine is cut off. Not only does this arrangement result in a potentially increased down time for the stopped machine, but it further facilitates the process of return to normal operation and of filling the emptied slots or emptying the filled slots of the drum, simultaneously with the restoration of normal functioning.

As is evident and as a result of the preceding description, the invention is not limited to the applications and embodiments specifically considered. To the contrary, it encompasses all variants.

We claim:

1. A buffer storage apparatus for containers, in particular bottles (26) or the like, the apparatus being adapted to be incorporated between a beginning-of-line machine (2) and an end-of-line machine (4) in order to regulate a transport feed rate of containers circulating from the beginning-of-line machine to the end-of-line machine in the event that either of the machines is slowed or briefly stopped, the buffer storage apparatus comprising:

a) an elongated frame (14);

b) an elongated drum (15) capable of being driven in rotation around a longitudinal axis, the drum being supported as it rotates by the frame;

c) a plurality of axially parallel transport slots (30) provided on the drum and uniformly spaced around a periphery thereof, the slots being configured to receive containers extending substantially radially while retaining the containers in succession one after the other;

d) drive means (17) for rotatably indexing the drum position by position around its axis to bring a selected slot to a position between stationary container feed and stationary container removal means, said feed and removal means being aligned in conjunction parallel to the axis of the drum and supported on opposite ends of the frame; and e) container transport means (31) for moving the containers (26) in a selected slot brought into a position coincident with the feed and removal means, f) wherein said container transport means are pneumatic means for acting on necks of the containers, said pneumatic means being supported on the frame and being movable radially to selectively occupy a lowered position radially close to the drum and surrounding the necks of the containers located in a selected slot brought into position between the feed and removal means to move the containers forward in said slot, and a raised position radially away from the drum to release the necks of the containers in the slot extending between the feed and removal means and permit rotation of the drum.

2. An apparatus according to claim 1, wherein each slot comprises longitudinal, parallel guides (27) carried by a body of the drum, and extending in a direction of the longitudinal axis of the drum to form a guide support for bodies of the containers engaged in the slot.

3. An apparatus according to claim 2, wherein container neck support sections (25) and said longitudinal guides (27) are radially and transversely adjustable so as to adapt the slot to containers of different dimensions (26, 29).

4. An apparatus according to claim 1, wherein the means for feeding, removing, and transporting the containers are positioned on an upper part of the frame.

5. An apparatus according to claim 1, further comprising an operational-control mechanism (50) for reducing the speed of the end-of-line machine in the event of a failure of the beginning-of-line machine (2), and for reducing the speed of the beginning-of-line machine in the event of a stoppage of the end-of-line machine (4).

6. An apparatus according to claim 1, wherein the beginning-of-line machine is a bottle manufacturing machine, and the end-of-line machine is a bottle filling machine.

* * * * *